United States Patent
Hong et al.

(10) Patent No.: US 7,748,139 B2
(45) Date of Patent: Jul. 6, 2010

(54) LAUNDRY DRYER AND DRUM SUPPORTING ASSEMBLY THEREOF

(75) Inventors: Kyung Seop Hong, Incheon-si (KR); Jun Seok Lee, Daegu-si (KR); Seong No Yoon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 557 days.

(21) Appl. No.: 11/016,936

(22) Filed: Dec. 21, 2004

(65) Prior Publication Data
US 2005/0132604 A1    Jun. 23, 2005

(30) Foreign Application Priority Data

| Dec. 22, 2003 | (KR) | ........................ 10-2003-0094474 |
| Dec. 22, 2003 | (KR) | ........................ 10-2003-0094475 |
| Dec. 22, 2003 | (KR) | ........................ 10-2003-0094476 |

(51) Int. Cl.
*F26B 25/00* (2006.01)
*F26B 3/34* (2006.01)
(52) U.S. Cl. .................. 34/601; 34/603; 34/242
(58) Field of Classification Search ............... 34/595, 34/601, 602, 603, 139, 108; 384/202, 286, 384/485, 504, 537
See application file for complete search history.

(56) References Cited

U.S. PATENT DOCUMENTS

| 3,457,656 | A | | 7/1969 | Fox |
| 4,148,408 | A | * | 4/1979 | Wolf ........................... 220/200 |
| 5,407,310 | A | * | 4/1995 | Kassouni ..................... 411/107 |
| 5,483,756 | A | | 1/1996 | Heyder |
| 6,082,022 | A | * | 7/2000 | St. Louis ...................... 34/602 |
| 6,250,639 | B1 | * | 6/2001 | Hayes et al. ................. 277/350 |
| 6,374,700 | B1 | * | 4/2002 | Jarzyna .................... 74/606 R |

FOREIGN PATENT DOCUMENTS

| DE | 78 11 868 U1 | | 8/1978 |
| EP | 1 507 036 A2 | | 2/2005 |
| GB | 1 224 496 | | 3/1971 |
| GB | 2253883 A | * | 9/1992 |
| JP | 58 217818 A | | 12/1983 |

* cited by examiner

*Primary Examiner*—Jiping Lu
(74) *Attorney, Agent, or Firm*—Birch, Stewart, Kolasch & Birch, LLP

(57) ABSTRACT

A laundry dryer includes a dry drum in which laundry is loaded, a lower housing coupled to a rear wall of the dry drum by a rivet, an upper housing seated on the upper housing, and a journal bearing including a bearing inserted between the upper and lower housings and a shaft coupled to the bearing.

22 Claims, 9 Drawing Sheets

LAUNDRY DRYER AND DRUM SUPPORTING ASSEMBLY THEREOF

BACKGROUND OF THE INVENTION

1. Field of the Invention

The present invention relates to a laundry dryer, and more particularly, to drum supporting assembly that can allow a drum to be supported on a cabinet, thereby maintaining a horizontal state.

2. Description of the Related Art

Generally, a drum-type laundry dryer is designed to perform the drying operation while rotating laundry loaded in a dry drum. The laundry rotates and drops by the rotation of the laundry drum. High-temperature dry air introduced into the dry drum is mixed with the laundry to vaporize the moisture soaked in the laundry. The laundry dryer may be classified into a condenser-type dryer and an exhaust-type dryer. The former is designed such that the air in the dry drum is directed to a condenser and a heater and is then returned to the dry drum. That is, the air circulates in the dryer without being exhausted out of the dryer. The latter is designed such that the air in the dry drum is directed to the condenser so that the moisture contained in the air can be eliminated and is then exhausted out of the dryer.

The exhaust-type dryer can be further classified into a gas-type and an electric-type. The former has a heater comprised of a funnel, an igniter and a flame sensor. The gas is burnt in the funnel to generate heat, thereby heating air introduced into the dry drum. The latter has a heater formed of a plurality turns of heat wire to heat the air introduced into the dry drum. When the electric power is applied, the heater generates heat transmitted to the air passing through the heater to change the air into high temperature air. The high temperature air is introduced into the drum to dry the laundry.

In the prior dryer, a front inner circumference of the drum is seated and supported on the front cover while a rear surface of the drum is provided at a center with a bearing connected to and supported on a back cover of the dryer.

In the prior drum supporting assembly, however, as the drum is rotated and vibrated, the bearing can be effectively absorbs the vibration. Accordingly, the vibration generated when the drum rotates is transmitted to the cabinet of the dryer, thereby vibrating the cabinet on the flour.

In addition, the lubricant for the bearing may be leaked to the outer side, the rear surface of the drum becomes dirty. Sometimes, the leaked lubricant may stain the laundry.

Furthermore, by the leakage of the lubricant for the bearing, frictional force between the drum and the bearing is increased, thereby damaging the bearing and deteriorating the effective rotation of the drum.

SUMMARY OF THE INVENTION

Accordingly, the present invention is directed to a drum supporting assembly of a laundry dryer that substantially obviates one or more problems due to limitations and disadvantages of the related art.

An object of the present invention is to provide a drum supporting assembly that can prevent the dryer from being vibrated on the flour by effectively absorbing vibration generated by the rotation of the drum.

Another object of the present invention is to provide a drum supporting assembly of a laundry dryer that can prevent lubricant from being leaked out of a bearing so that the drum can smoothly rotate by reducing frictional force between the bearing and the rear wall of the drum.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a laundry dryer comprising: a dry drum in which laundry is loaded; a lower housing coupled to a rear wall of the dry drum by a rivet; an upper housing seated on the lower housing; and a journal bearing including a bearing inserted between the upper and lower housings and a shaft coupled to the bearing.

In another aspect of the present invention, there is provided a laundry dryer comprising: a supporting member having a shaft and a bearing coupled to an outer circumference of the shaft through an insert injection molding process; a housing enclosing a portion of the supporting member, the housing having a projected portion elevated by a predetermined height and a concaved portion concaved by a predetermined depth; an outer seal covering a portion of the housing; and an inner seal covering an outer portion of the supporting member to prevent oil leakage.

In still another aspect of the present invention, there is provided a laundry dryer comprising: a housing; a bearing member receiving in the housing and formed by an insert injection molding process; an inner seal inserted in the housing to prevent the friction and noise; and an outer seal seated on an outer surface of the housing to prevent lubricant from being leaked.

By the above-described drum supporting assembly for the laundry dryer, the vibration generated by the rotation of the drum can be effectively absorbed, thereby preventing the dryer from vibrating.

In addition, since lubricant is not leaked out oft he bearing unit, the stain of the laundry can be prevented.

Furthermore, since frictional force between the drum and the bearing during the rotation of the dry drum is reduced, the dry drum can be smoothly rotated, by which a service life of a motor for operating the bearing unit and the dry drum can be increased.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
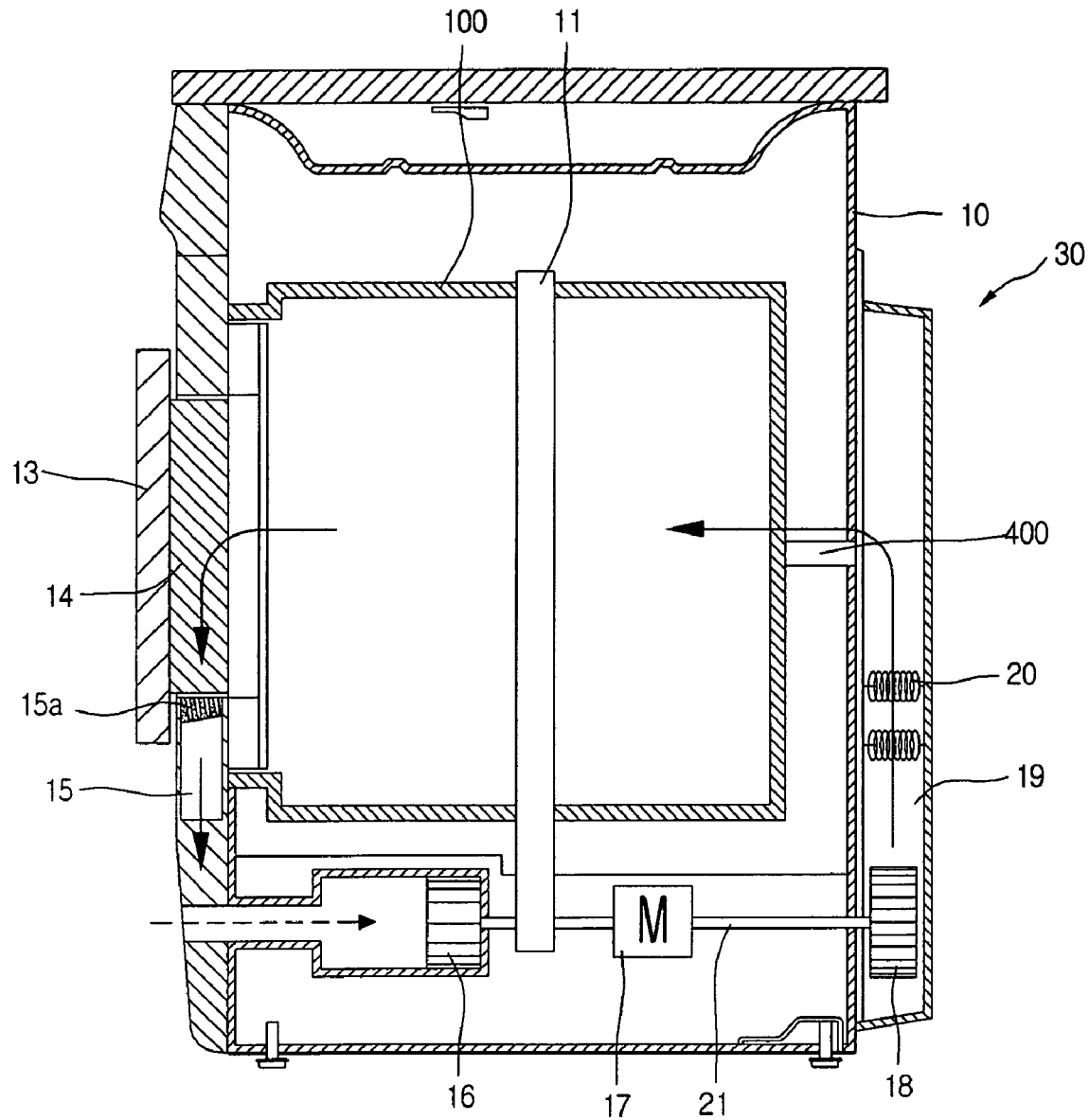
FIG. 1 is a sectional view of a condenser-type laundry dryer with a condenser assembly according to an embodiment of the present invention.

FIG. 1 is a sectional view of a condenser-type laundry dryer with a condenser assembly according to an embodiment of the present invention.

Referring to FIG. 1, a condenser-type laundry dryer 30 includes a cabinet 10, a cylindrical drum 100 mounted in the cabinet 10 to receive the laundry therein, a door 13 controlling the opening of the drum 100, a belt 11 disposed around an outer circumference of the drum 100 to rotate the drum 100, and a journal bearing 400 for supporting the drum 100 on the cabinet 10. The front portion of the drum 100 is supported by a front portion of the cabinet 10.

The condenser-type laundry dryer 30 further includes a motor shaft 21 connected to the belt 11 to transmit rotational force to the drum 100, a motor 17 for transmitting the rotational force to the motor shaft 21, and a cooling fan 16 connected to a first end of the motor shaft 21 to rotate by receiving the rotational force of the motor 17 and intake interior air.

The laundry dryer 30 further includes a dry fan 18 connected to a second end of the motor shaft 15 to circulate air in the drum 100, a dry duct 19 defining a passage for transmitting air introduced by the dry fan 18 to the drum 100, and a heat generating unit 20 mounted in the dry duct 19.

The laundry dryer further includes a door lint filter 14 formed on a rear surface of the door 13 for primarily filtering foreign objects contained in the circulating air and a body lint filter 15a for secondary filtering foreign objects contained in the circulating air passing through the door lint filter 14. There is provided a circulation duct 15 along which the circulating air passing through the body lint filter 15a is directed to a condenser (not shown).

The operation of the above-described laundry dryer will be described hereinafter.

When electric power is applied to the dryer, the motor 17 is operated and the heater 20 mounted in the dry duct 19 is heated. Then, the belt 11 connected to the motor shaft 21 rotates to rotate the drum 100. As the drum 100 rotates, the laundry in the drum 100 is lifted and dropt by a lift (not shown) mounted on the inner wall of the drum 100.

Meanwhile, the dry fan 18 connected to the motor shaft 21 rotates by the rotation of the motor 17 to introduce the circulating air via the condenser. The air flows upward along the dry duct 19 and passes through the heater 20 to be converted into high-temperature/dry air. Then, the air is directed into the drum to absorb the moisture contained in the laundry, thereby being converted into the high-temperature/damp air.

The high-temperature/damp air is directed to the condenser along the circulation duct 15 via the door lint filter 14 and the body lint filter 15a.

Meanwhile, as the cooling fan 16 connected to the motor shaft 21 rotates, interior air out of the dryer is induced into the dryer. The interior air is directed to the condenser via the cooling fan 16. The high-temperature/damp air and the interior air are not mixed with each other but heat-exchanged.

Accordingly, the high-temperature/damp air gives heat to the interior air as it goes through the condenser, thereby being changed into low-temperature/damp air, in the coursed of which the moisture contained in the low-temperature/damp air is condensed. The condensed moisture is dropt on the surface of the condenser 200 and is then directed to a sump (not shown).

The moisture directed to the sump is transmitted to a drawer (not shown) disposed on an upper portion of the dryer 30.

Meanwhile, the interior air passing trough the condenser 200 takes the heat from the high-temperature/damp air to change the circulating air into the low-temperature/damp air. As a result, the temperature of the interior air is increased.

Figure 2:
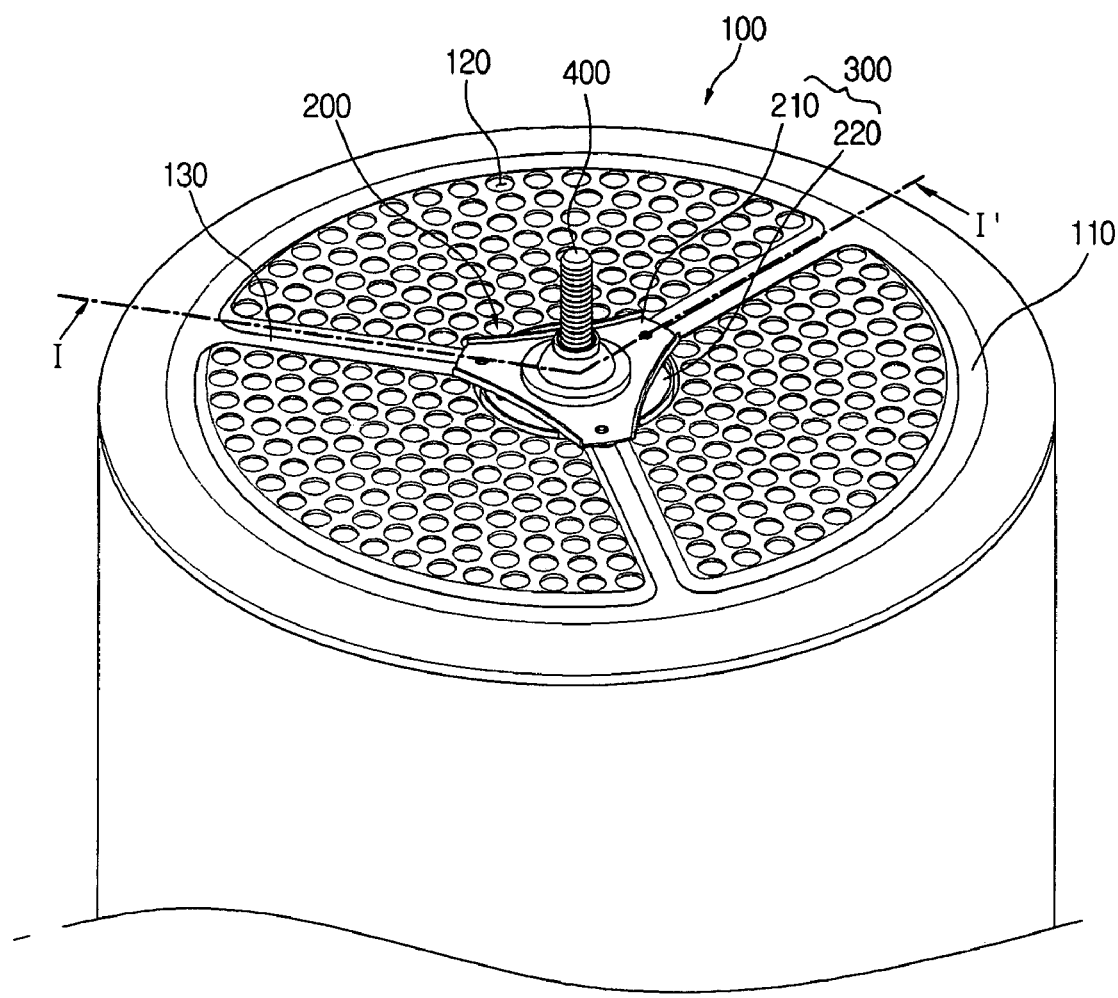
FIG. 2 is a rear perspective view of a drum with a drum supporting assembly according to an embodiment of the present invention.

FIG. 2 shows a rear perspective view of the drum with a drum supporting assembly according to an embodiment of the present invention.

Referring to FIG. 2, a rear surface of the drum 100 includes a drum rear wall 110 and a drum supporting unit attached on a center of the drum rear wall 110.

The drum rear wall 110 is provided with a plurality of circulation air passage holes 120 for directing high temperature/dry air from the dry duct 19 into the drum 100 and a central drum seating groove (140 in FIG. 3) for supporting the drum supporting unit 200. Herein, the supporting unit 200 includes a housing 300 having upper and lower housings 210 and 220 and a journal bearing 400 inserted in the housing 300 to support the drum 100.

The drum rear wall 110 is concaved by a predetermined depth at a location spaced away from an edge. A portion where the circulating air passage holes 120 are formed is elevated by a predetermined height. Accordingly, the heights of the edge and the portion where the circulating air passage holes 120 are formed the of the rear wall 110 are almost identical to each other. The drum rear wall 110 is further provided with load supporting surfaces 130 formed to be lower than the portion where the circulating air passage holes 120 are formed. Here, the load supporting surfaces 130 are formed in a radial direction from the center of the rear wall 110. That is, the drum rear wall 110 is divided into a plurality of sections.

A load of the drum and laundry received in the drum 100 is transmitted to the journal bearing unit 200 mounted on the drum 100. The load transmitted to the journal bearing unit 200 is dispersed along the load supporting surfaces 130 of the drum rear wall 110.

Since the drum rear wall 110 is provided with a plurality of circulating air passage holes 120, when the drum rear wall 110 is subject to the load corresponding to the drum 100, the drum rear wall 110 may be deformed. The load supporting surfaces 130 are provided to prevent this. Accordingly, the load supporting surfaces 130 function to disperse the load applied to the drum rear wall 110 and to prevent the deformation of the drum rear wall 110.

In order to uniformly disperse the load through the whole area of the load supporting surfaces 130, the load supporting surfaces 130 are disposed and spaced away from each other at an identical angular distances, preferably, by 1200.

Figure 3:
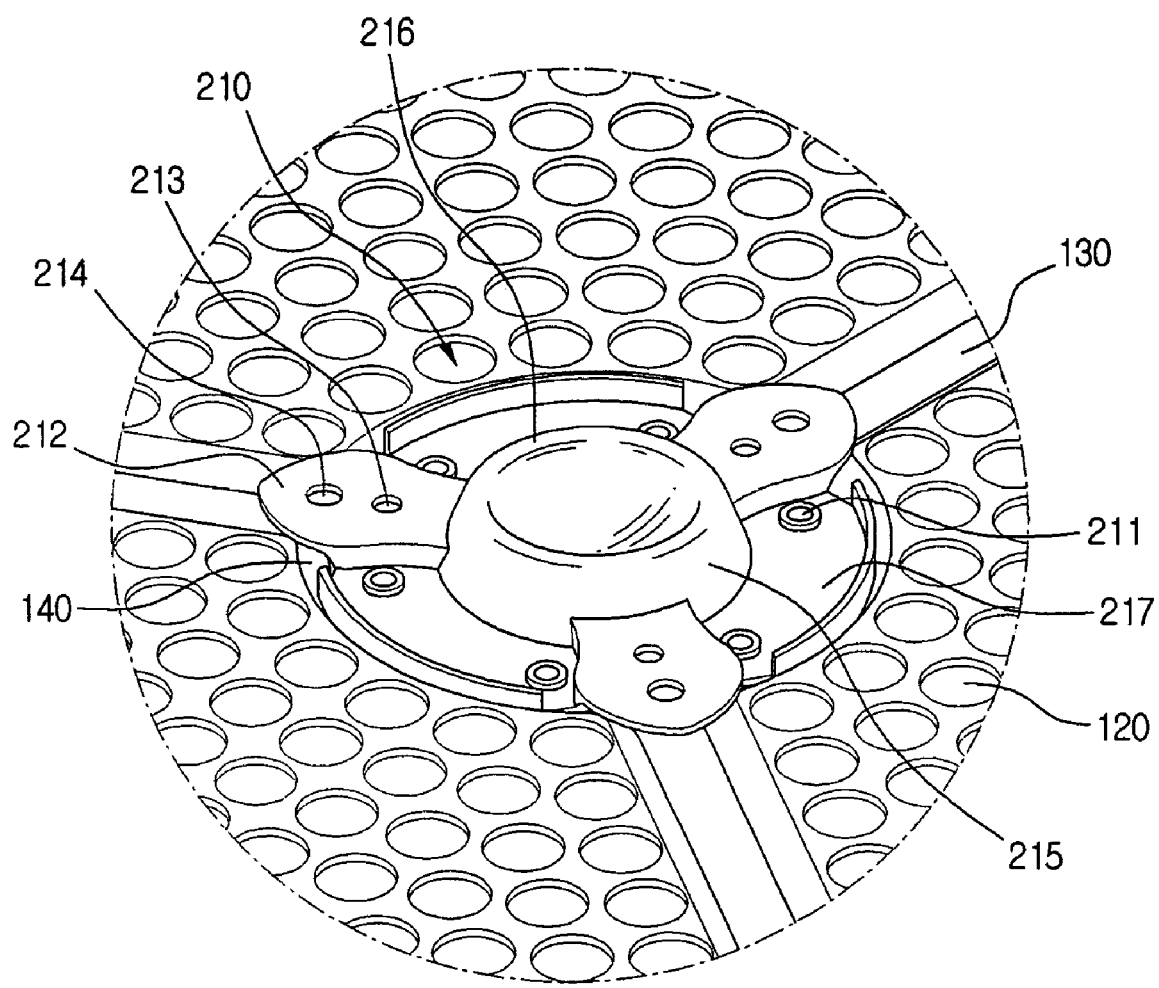
FIG. 3 is a partial perspective view illustrating a state where a lower housing of a drum supporting unit is mounted on a rear wall of the drum according to an embodiment of the present invention.

FIG. 3 shows a front perspective view of a condenser according to an embodiment of the present invention.

Referring to FIG. 3, the lower housing 210 is mounted on the seating groove 140 of the drum supporting unit formed on the center of the drum rear wall 110. The lower housing 210 is coupled to the upper housing 220 and the journal bearing 400 is inserted in the lower housing so that the drum 100 is supported on the rear portion of the dryer.

That is, the lower housing 210 includes a circular main body 217, a bearing seating portion 215 elevated from the center of the main body 217, a coupling end 212 formed extending from the bearing seating portion 215 and coupled to the upper housing 220, and a coupling member 211 coupled to the drum rear wall 110.

The bearing seating portion 215 is concaved by a predetermined depth to receive the journal bearing 400. By the coupling member 211, the lower housing 210 is rivet-coupled to the drum rear wall 110, whereby the damage of the laundry by the projection of the coupling member into the drum 100 can be prevented. However, the present invention is not limited to this rivet coupling.

In addition, the coupling end 212 is bent from the main body 217 and elevated by a predetermined height. Accordingly, the coupling member penetrating the coupling end 212 does not interfere with the drum rear wall 110. Even when the end of the coupling end 212 extends from the outer circumference of the main body 217 in the radial direction, it does not interfere with the drum rear wall 110.

The coupling end 212 is formed on an identical line to the respective load supporting surfaces 130. The coupling end 212 is provided with a coupling hole 214 in which a coupling member for coupling the upper housing 220 will be inserted. A sub-coupling hole 213 is formed at a portion spaced away from the coupling hole 214 so that a sub-coupling projection 223 (see FIG. 5) projected at the upper housing 220 can be inserted therein. By inserting the sub-coupling projection 223 is inserted into the sub-coupling hole 213 before the upper housing 220 is coupled to the lower housing 210 by the coupling member, the coupling member may be easily inserted.

In addition, an inner seal contacting surface 216 may be formed around the concave portion formed on the upper surface of the bearing seating portion 215. Lubricant is deposited on the concave portion to reduce the frictional force with the journal bearing 400.

Figure 4:
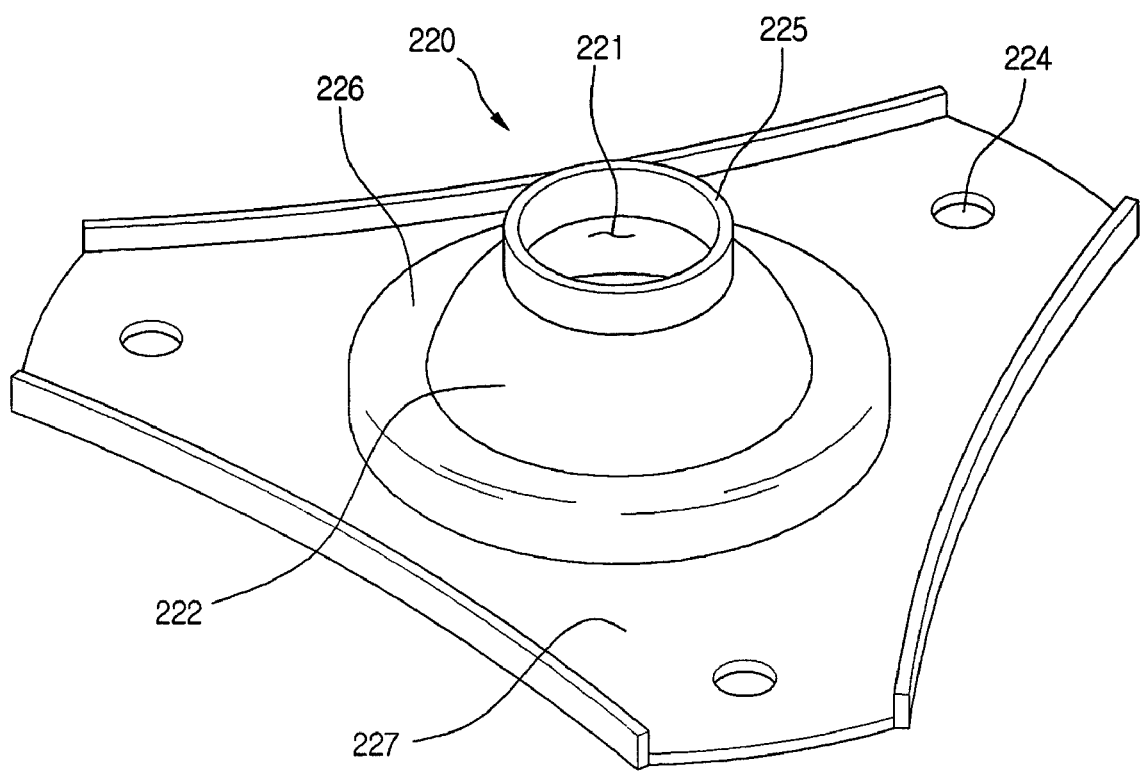
FIG. 4 is a front perspective view of an upper housing of a drum supporting unit according to an embodiment of the present invention.
Figure 5:
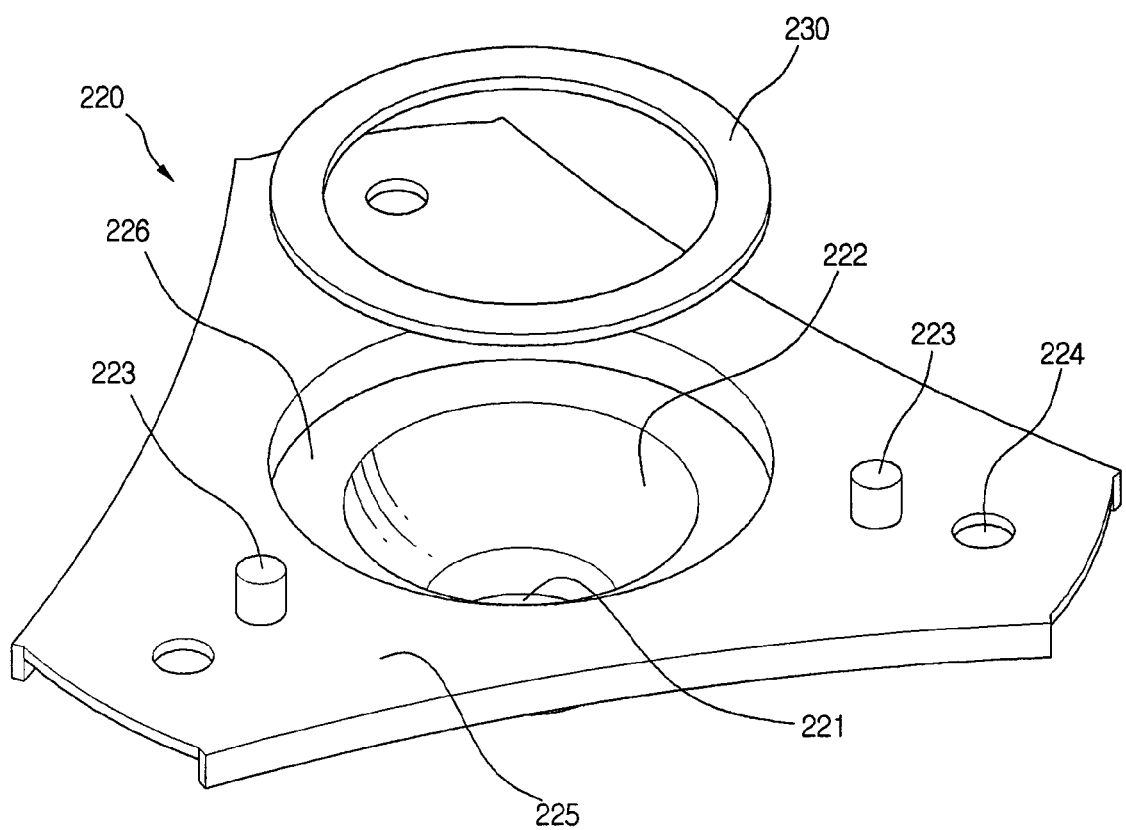
FIG. 5 is a rear perspective view of an upper housing depicted in FIG. 4.

FIG. 4 shows a rear perspective view of a condenser depicted in FIG. 3 and FIG. 5 shows a side perspective view of a condenser depicted in FIG. 3.

Referring to FIGS. 4 and 5, the upper housing 220 is coupled to the lower housing 210 as described above.

That is, the upper housing 220 includes a main body 227, an inner seal seating portion 226 concaved by a predetermined depth at a center of the main body 227 to receive the inner seal 230, a bearing receiving portion 222 further concaved from the inner seal seating portion 226 to receive the journal bearing 400, and a cylindrical supporting sleeve 225 extending from the top of the bearing receiving portion 222 by a predetermined length.

The bearing receiving portion 222 is rounded with a curvature identical to that of the bearing (410 in FIG. 6) mounted on an end of the journal bearing 400. A shaft (420 in FIG. 6) of the journal bearing 400 penetrates into the supporting sleeve 225.

In the main body 227, a portion contacting the upper housing coupling end 212 of the lower housing 210 is formed to be longer than other portions. Accordingly, the main body 227 of the upper housing is formed in a triangular shape. Here, according to the number of the upper housing coupling end 212, the main body 227 of the upper housing may be varied without departing from the concept of the present invention. The main body 227 of the upper housing is provided with a coupling hole 224 aligned with the coupling hole 214 formed on the coupling end of the lower housing 210.

The upper housing 220 is further provided with a sub-coupling projection 223 inserted in the sub-coupling hole 213 of the lower housing 210. The sub-coupling projection 223 is formed at a portion spaced away from the coupling hole 224. Accordingly, it can be noted that locations where the coupling hole 214 of the lower housing 210 and sub-coupling hole 213 of the lower housing are identical to those where the coupling hole 224 and sub-coupling projection 223 of the upper housing 220. The sub-coupling projection 223 is formed at two or more locations to prevent the upper housing 220 from moving in a state where the upper housing 220 is sub-coupled to the lower housing 210. The sub-coupling hole 213 formed on the lower housing 210 is formed on the entire portion of the coupling end 212 of the upper housing so that the sub-coupling projection 223 can be inserted into the sub-coupling hole 213 regardless of the seating location of the upper housing 220.

Alternatively, the sub-coupling projection 223 may be formed on the lower housing 210 and the insertion hole in which the sub-coupling projection 223 is inserted may be formed on the upper housing 220.

The circular inner seal 230 is disposed on the inner seal seating portion 226 formed on the upper housing 220. That is, by seating the inner seal 230 on an inner side of the upper housing 220, the leakage of the lubricant out of the bearing receiving portion 222 can be prevented. The inner seal 230 may be formed of pelt material that can effectively absorb noise and prevent the leakage of the lubricant.

Figure 6:
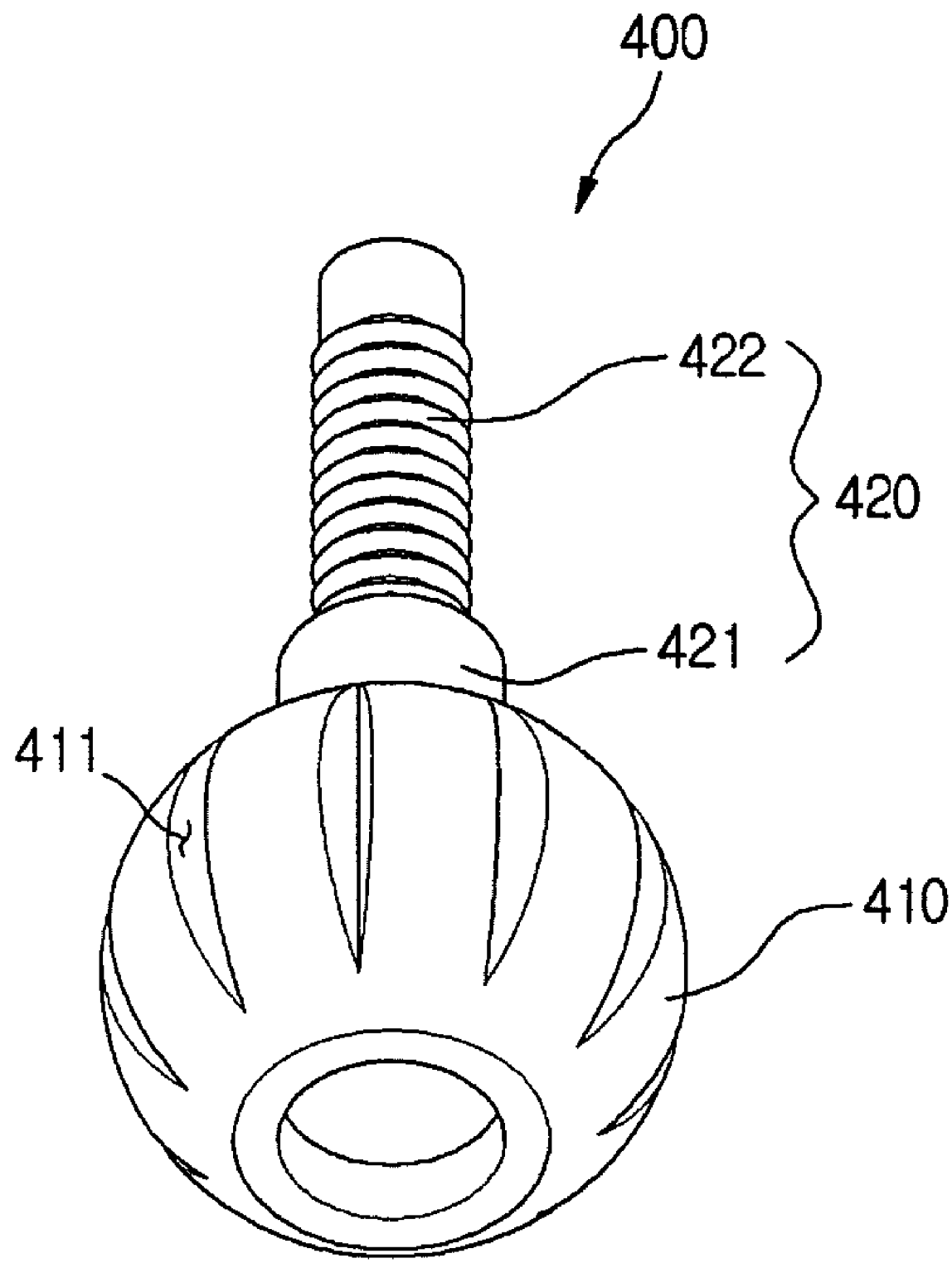
FIG. 6 is a perspective view of a journal bearing of a drum supporting unit according to an embodiment of the present invention.

FIG. 6 shows a perspective view of a journal bearing of a drum supporting unit according to an embodiment of the present invention.

Referring to FIG. 6, the journal bearing 400 of the present invention includes a bearing 410 receiving in the housing 300 and a shaft 420 extending from the bearing 410 and penetrating the rear surface of the dryer.

The bearing is provided at an outer circumference with a plurality of grooves 411 so that the lubricant can be uniformly deposited on the inner circumference of the housing 300. The oil grooves 411 are formed in a direction of an axis of the shaft 420 to allow the lubricant deposited on the inner circumference of the housing 300 to effectively move.

An end of the bearing 410 is cut in a direction perpendicular to a central axis of the shaft 420. Accordingly, a predetermined space is defined between the bottom of the bearing 410 and the bearing seating portion 215. The lubricant adhered to the oil grooves 411 is collected in the space after flowing downward. The lubricant flows along the space and the oil grooves as the drum 100 rotates, thereby depositing the whole surface of the bearing.

The shaft 420 of the journal bearing 400 is inserted in the central portion of the bearing 410, including a shaft body 421 and a back cover coupling portion 422 extending from an end of the shaft body 421 and provided at an outer circumference with a thread.

The shaft body 421 is coupled on the bearing 410 through an insert injection molding process. A portion of the shaft body 421, which is exposed to an outer circumference of the bearing 410 by a predetermined length, is inserted into the supporting sleeve 225 of the upper housing 220 when the journal bearing 400 is coupled to the housing 300.

The back cover coupling portion 422 is coupled to a back cover (not shown) defining a rear surface of the dryer after penetrating the supporting sleeve 225 of the upper housing 220. The back cover coupling portion 422 is projected to an outer side after penetrating the back cover. A nut is fitted on the projected portion of the back cover coupling portion 422 so that the rear portion of the drum 100 can be supported on the back cover.

Figure 7:
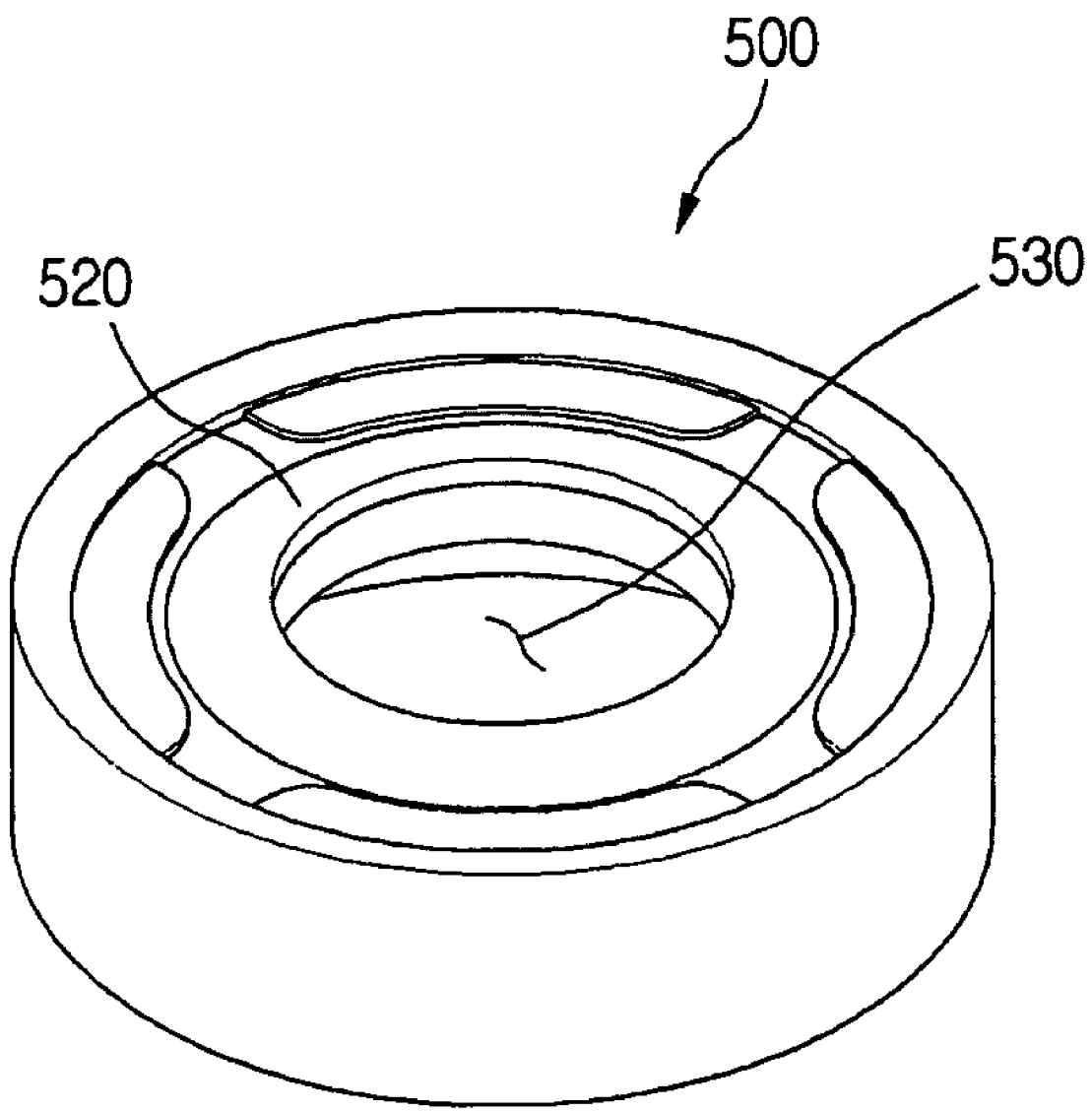
FIG. 7 is an outer perspective view of an outer seal of a drum supporting unit according to an embodiment of the present invention.
Figure 8:
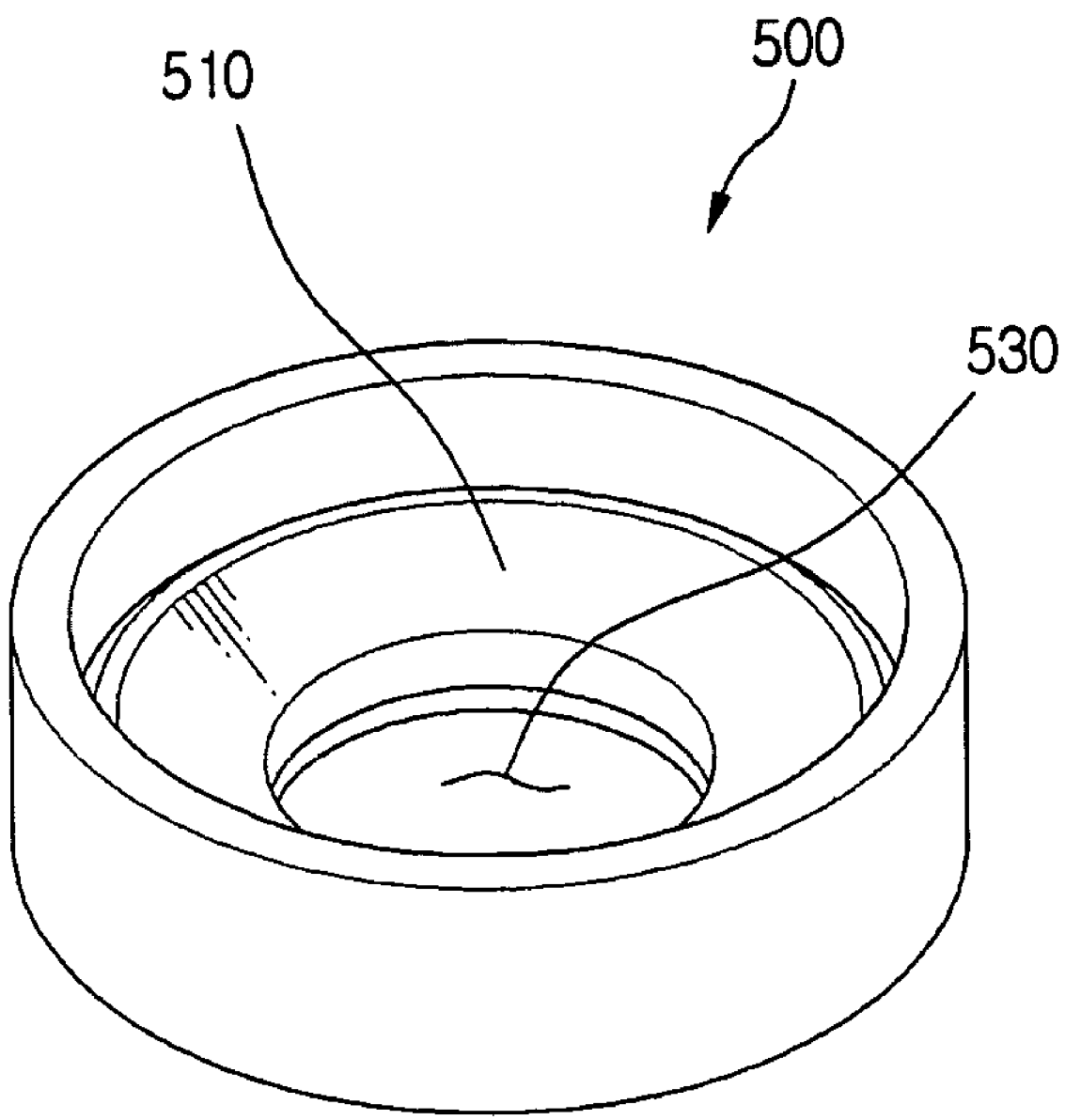
FIG. 8 is an internal perspective view of an outer seal depicted in FIG. 7.

FIG. 7 shows an outer perspective view of an outer seal of a drum supporting unit according to an embodiment of the present invention and FIG. 8 is an internal perspective view of an outer seal depicted in FIG. 7.

Referring to FIGS. 7 and 8, an outer seal 500 is inserted around the supporting sleeve 225 of the upper housing 220.

An inner diameter of the outer seal 500 is identical to an outer diameter of the supporting sleeve 225 to prevent the lubricant in the housing 300 from being leaked out of the upper housing 220.

The outer seal 500 includes a body 600 formed of metal and a rubber seal covering the body 600 through an insert injection molding process. Accordingly, the deformation of the outer seal 500 can be prevented by the metal body 600.

In order to prevent the lubricant from being leaked along the outer circumference of the shaft 410, a dual-layer is formed in the outer seal 500.

The dual layer includes an inner layer 510 formed on an inner surface of the outer seal 500 and an outer layer 520 formed on an outer portion of the inner layer 510 to define an outer circumference of the outer seal 500. The back cover coupling hole 530 penetrating the back cover coupling portion 422 of the journal bearing 400 is formed on the inner portion of the dual-layer. That is, end portions of the inner and outer layers 510 and 520 encloses an outer circumference of the back cover coupling portion 422 to prevent the lubricant from being leaked along the outer circumference of the back cover coupling portion 422. Since the inner and outer layers 510 and 520 are layered, the leakage of the lubricant can be dually prevented.

Figure 9:
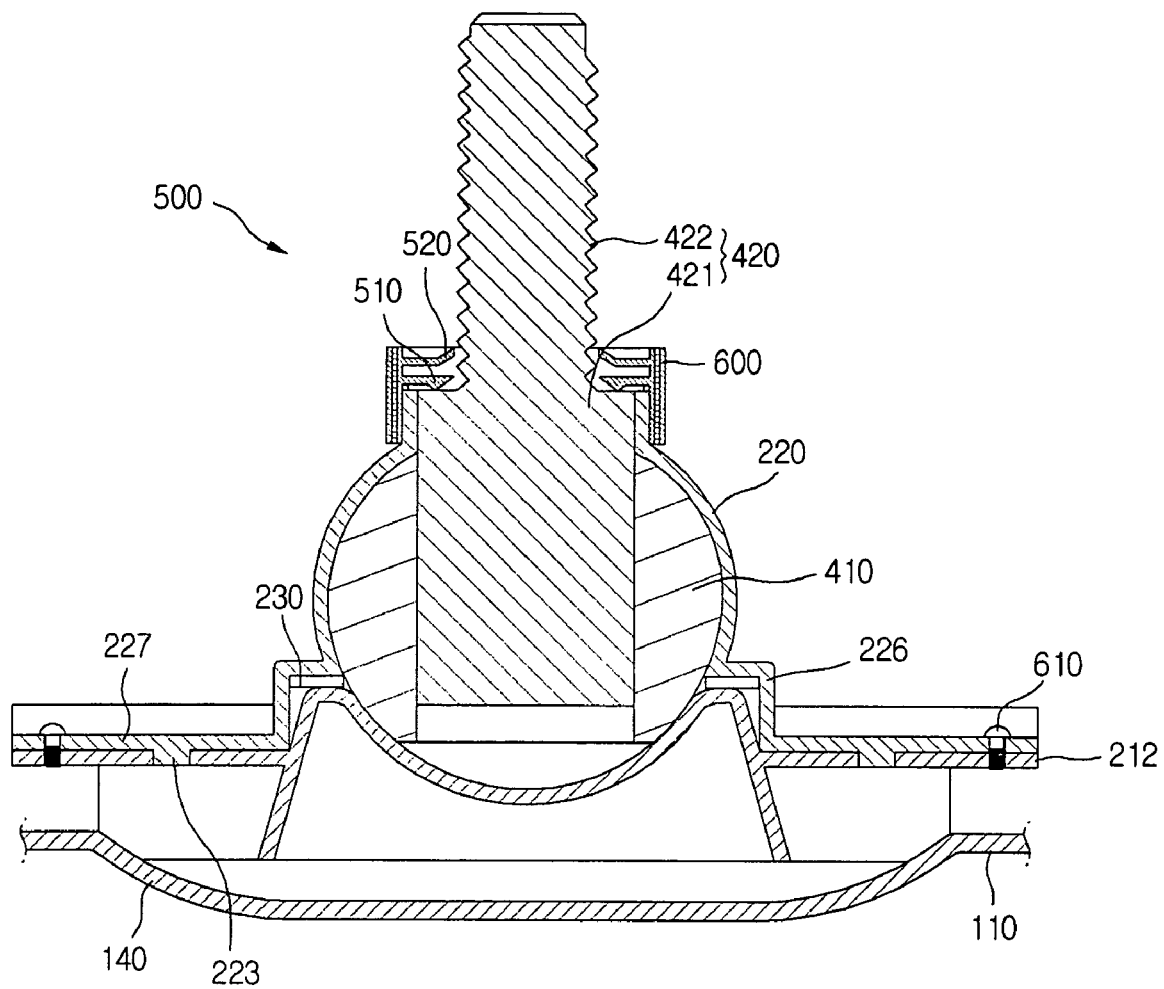
FIG. 9 is a sectional view taken along line I-I' of FIG. 2.

FIG. 9 shows a sectional view taken along line I-I' of FIG. 2.

Referring to FIG. 9, the drum supporting portion 200 is seated on the drum supporting seating groove 140 formed on the central portion of the drum rear wall 110.

The lower housing 210 is coupled to the drum supporting seating groove 140 by a rivet. The bearing 410 of the journal bearing 400 is seated on the bearing seating portion 215 of the lower housing 210. The upper housing 220 is fitted around the shaft 420 of the journal bearing 400 and seated on the top of the lower housing 210. The upper and lower housings 220 and 210 are coupled to each other by the coupling member 610. The outer seal 500 is seated on the top of the upper housing 220 (on the outer circumference of the supporting sleeve 225. The back cover coupling portion 422 of the journal bearing 400 penetrates the back cover of the dryer. A nut member is inserted around the outer circumference of the back cover coupling portion 422 so that the shaft 420 can be supported on the back cover.

Meanwhile, when the drum 100 rotates, the housing 300 and outer seal 500 coupled to the drum rear wall 110 rotates together. However, the journal bearing 400 coupled to the back cover does not rotate but maintains the fixed state. Accordingly, when the drum 100 rotates, the inner circumference of the bearing receiving portion 222 of the upper housing 220 conflicts with the outer circumference of the bearing 410. At this point, the lubricant stored in the bearing receiving portion 222 attenuates the frictional force between the inner circumference of the bearing receiving portion 222 and the outer circumference of the bearing 410.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A laundry dryer comprising:
   a dryer drum in which laundry is to be loaded;
   a lower housing located at and coupled to an outer side of a rear wall of the dryer drum by a coupling member;
   an upper housing seated on the lower housing;
   a journal bearing including a bearing inserted between the upper and lower housings, and a shaft coupled to the bearing; and
   a sealing member covering an upper portion of the upper housing and a portion of the shaft,
   wherein the shaft includes a shaft body inserted in the upper housing and a coupling portion extending from an end of the shaft body, an outer circumference of the coupling portion provided with a thread,
   wherein the sealing member includes a body portion and a rubber seal covering the body portion through an insert injection molding process, the rubber seal including:
      a lower portion surrounding an outer circumference of the upper housing;
      an upper portion having an inner layer extended radially inward from the upper portion, and
      an outer layer extended radially inward from the upper portion and layered on the inner layer, end portions of the inner and outer layers enclosing said outer circumference of the coupling portion to prevent the lubricant in the housings from being leaked along the outer circumference of the shaft, and
   wherein the inner layer contacts an outer surface of the shaft body.

2. The laundry dryer according to claim 1, wherein the lower housing is provided with a bearing seating portion having a concaved portion for receiving the bearing.

3. The laundry dryer according to claim 1, wherein the lower housing is provided with a bearing seating portion elevated on the lower housing by a predetermined height.

4. The laundry dryer according to claim 1, wherein the lower housing comprises a coupling end bent by a predetermined height and coupled to the upper housing.

5. The laundry dryer according to claim 4, wherein the coupling end is provided with a coupling hole in which a coupling member is inserted.

6. The laundry dryer according to claim 4, wherein the coupling end further extends in a radial direction from an edge of the lower housing.

7. The laundry dryer according to claim 1, wherein the upper housing is provided with a concaved seating portion on which a sealing member is seated.

8. The laundry dryer according to claim 1, wherein the upper housing is provided with a concaved bearing receiving portion in which the bearing is received.

9. The laundry dryer according to claim 1, wherein the upper housing includes a supporting sleeve elevated upward by a predetermined height, the shaft being inserted in the sleeve.

10. The laundry dryer according to claim 1, wherein the upper housing is provided with a coupling hole through which a coupling member penetrates.

11. The laundry dryer according to claim 1, wherein the upper housing is provided with one of a sub-coupling projection or a sub-coupling hole and the lower housing is provided with rest one of the sub-coupling projection and a sub-coupling hole.

12. The laundry dryer according to claim 11, wherein the sub-coupling projection is formed at least two locations.

13. The laundry dryer according to claim 11, wherein the number of the insertion holes is identical to or more than that of the sub-coupling projections.

14. The laundry dryer according to claim 1, wherein the rear wall of the dryer drum has a concaved central portion to receive the lower housing.

15. The laundry dryer according to claim 1, wherein the rear wall of the dryer drum includes a hole through which circulating air is introduced into the dryer drum and a load supporting surface formed in a radial direction to support the load transmitted to the rear wall of the dryer drum.

16. The laundry dryer according to claim 1, further comprising a circular seal member inserted in the upper housing.

17. The laundry dryer according to claim 1, wherein the bearing is coupled to an outer circumference of the shaft through an insert injection molding process.

18. The laundry dryer according to claim 1, wherein the bearing is provided with an oil groove.

19. The laundry dryer according to claim 1, wherein the bearing is provided with an oil groove formed aligning a direction of an axis of the shaft.

20. The laundry dryer according to claim 1, wherein a nut can be thread-coupled around the shaft.

21. The laundry dryer according to claim 1, wherein lubricant is deposited on an inner circumference of the upper and/or lower housing.

22. The laundry dryer of claim 1, wherein the coupling member is a rivet.

* * * * *